(12) United States Patent
Songa et al.

(10) Patent No.: US 10,971,155 B2
(45) Date of Patent: Apr. 6, 2021

(54) AIRCRAFT SYSTEMS AND METHODS FOR MONITORING ONBOARD COMMUNICATIONS

(71) Applicant: HONEYWELL INTERNATIONAL INC., Morris Plains, NJ (US)

(72) Inventors: Anil Kumar Songa, Bangalore (IN); Paula Renee Gardner, Spring Hill, KS (US); Kishore Kumar Sandrana, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 69 days.

(21) Appl. No.: 15/952,021

(22) Filed: Apr. 12, 2018

(65) Prior Publication Data
US 2019/0318741 A1 Oct. 17, 2019

(51) Int. Cl.
  *G10L 15/26* (2006.01)
  *G08G 5/00* (2006.01)
  *G10L 15/22* (2006.01)
(52) U.S. Cl.
  CPC .......... *G10L 15/26* (2013.01); *G08G 5/0013* (2013.01); *G08G 5/0021* (2013.01); *G10L 15/22* (2013.01); *G10L 2015/227* (2013.01)
(58) Field of Classification Search
  CPC ..... G10L 15/22; G10L 15/265; G08G 5/0013; G08G 5/0021
  See application file for complete search history.

(56) References Cited

U.S. PATENT DOCUMENTS

| 7,110,866 B1* | 9/2006 | Dutu ................ B64D 45/0015 340/574 |
|---|---|---|
| 7,184,863 B2 | 2/2007 | Weineck |
| 7,415,326 B2 | 8/2008 | Komer et al. |
| 7,809,405 B1 | 10/2010 | Rand et al. |
| 7,881,832 B2 | 2/2011 | Komer et al. |
| 8,149,141 B2 | 4/2012 | Coulmeau et al. |
| 8,180,503 B2 | 5/2012 | Estabrook et al. |
| 8,280,741 B2 | 10/2012 | Colin et al. |
| 8,340,839 B2 | 12/2012 | Yogesha et al. |
| 8,681,040 B1 | 3/2014 | Rathinam et al. |

(Continued)

FOREIGN PATENT DOCUMENTS

EP 1318492 A2 6/2003

OTHER PUBLICATIONS

"Air-Ground Voice Communications," SKYbrary, downloaded from Internet Mar. 28, 2018.

(Continued)

*Primary Examiner* — Paras D Shah
(74) *Attorney, Agent, or Firm* — Lorenz & Kopf, LLP

(57) ABSTRACT

Methods and systems are provided for monitoring onboard communications after a change to a functionality of an onboard system. An exemplary method involves identifying a source initiating the change to the functionality of the onboard system, determining an expected response to the change to the functionality of the onboard system by a vehicle operator based at least in part on the change, the source, and one or more callout rules associated with the onboard system, monitoring for the expected response from the vehicle operator, and generating a user notification in response to an absence of the expected response from the vehicle operator.

20 Claims, 3 Drawing Sheets

(56) References Cited

U.S. PATENT DOCUMENTS

| | | | |
|---|---|---|---|
| 8,704,701 B2 | 4/2014 | Pschierer et al. | |
| 8,909,392 B1 | 12/2014 | Carrico | |
| 8,957,790 B2 * | 2/2015 | Cornell | G08G 5/0082 340/964 |
| 9,190,073 B2 | 11/2015 | Dong et al. | |
| 9,443,433 B1 | 9/2016 | Conway et al. | |
| 9,620,119 B2 | 4/2017 | Bilek et al. | |
| 9,642,184 B2 | 5/2017 | Plocher et al. | |
| 9,646,428 B1 * | 5/2017 | Konrardy | H04W 4/90 |
| 9,704,405 B2 | 7/2017 | Kashi et al. | |
| 10,099,636 B2 * | 10/2018 | Boesen | A61B 5/117 |
| 2004/0124998 A1 | 7/2004 | Dame | |
| 2004/0263381 A1 | 12/2004 | Mitchell et al. | |
| 2005/0182722 A1 * | 8/2005 | Meyer | G06Q 10/06 705/40 |
| 2005/0203700 A1 | 9/2005 | Merritt | |
| 2007/0288128 A1 | 12/2007 | Komer et al. | |
| 2010/0030400 A1 * | 2/2010 | Komer | G10L 15/26 701/3 |
| 2010/0087987 A1 * | 4/2010 | Huang | B60W 40/08 701/36 |
| 2011/0028147 A1 | 2/2011 | Calderhead, Jr. et al. | |
| 2011/0125503 A1 * | 5/2011 | Dong | G10L 15/22 704/275 |
| 2011/0196881 A1 * | 8/2011 | Deleris | G08G 5/0021 707/752 |
| 2011/0202351 A1 | 8/2011 | Plocher et al. | |
| 2011/0231036 A1 | 9/2011 | Yogesha et al. | |
| 2014/0137341 A1 * | 5/2014 | Yun | D06M 11/71 8/188 |
| 2015/0162001 A1 | 6/2015 | Kar et al. | |
| 2016/0125744 A1 | 5/2016 | Shamasundar et al. | |
| 2016/0155435 A1 | 6/2016 | Mohideen | |
| 2017/0039858 A1 * | 2/2017 | Wang | G10L 25/51 |
| 2017/0241798 A1 * | 8/2017 | Van Den Bergh | G01C 23/00 |
| 2017/0308080 A1 * | 10/2017 | Brooks | G05D 1/0077 |
| 2018/0354433 A1 * | 12/2018 | Melson | B60R 16/023 |
| 2019/0033862 A1 * | 1/2019 | Groden | G05D 1/0072 |

OTHER PUBLICATIONS

"Loss of Communication," SKYbrary, downloaded from Internet Mar. 28, 2018.

Cardosi, Kim and Tracy Lennertz. "Loss of Controller-Pilot Voice Communications in Domestic En Route Airspace." DOT-VNTSC-FAA-17-04, dated Feb. 2016.

* cited by examiner

AIRCRAFT SYSTEMS AND METHODS FOR MONITORING ONBOARD COMMUNICATIONS

TECHNICAL FIELD

The subject matter described herein relates generally to vehicle systems, and more particularly, embodiments of the subject matter relate to avionics systems and methods for improving operator awareness of functional changes to onboard systems by monitoring onboard communications.

BACKGROUND

Pilots and co-pilots are required to monitor a myriad of communication channels, sensors, and gauges and perform numerous control functions while operating aircraft. Such monitoring and control functions are becoming increasingly more difficult and critical as the complexities of aircraft increase. Avionics systems have been developed to automate some of the operational and monitoring requirements of aircraft; however, in many instances pilots and co-pilots still must manually monitor and operate most aspects of their aircraft in accordance with operational requirements or regulations that dictate how flight tasks are divided between captain and first officer. For example, the pilot flying the aircraft is responsible for performing various actions and managing certain operations of the aircraft while also verifying and calling out certain information or configuration changes, while the other pilot manages other operational aspects and is responsible for different callouts.

Pilots may have little difficulty memorizing routine actions and callouts on the ground; however, pilots are often subjected to increased mental workload and stress while operating the aircraft. As a result, a pilot's adherence to operational requirements or other safety regulations may decrease, which could compromise aircraft operations when the other pilot is not aware of changes to the configuration or functionality of various onboard systems. Accordingly, it is desirable to improve recognition of system changes without interfering with situational awareness or otherwise increasing mental workload. Other desirable features and characteristics of the methods and systems will become apparent from the subsequent detailed description and the appended claims, taken in conjunction with the accompanying drawings and the preceding background.

BRIEF SUMMARY

Systems and related methods for monitoring operations of a vehicle, such as an aircraft, are provided. In one embodiment, a computer-implemented method of monitoring operations involves an onboard processing system identifying a source initiating a change to a functionality of an onboard system and determining an expected response to the change to the functionality of the onboard system by a vehicle operator based at least in part on the change, the source, and one or more callout rules associated with the onboard system. The method continues by monitoring an input device for the expected response from the vehicle operator and generating a user notification in response to an absence of the expected response from the vehicle operator.

In one embodiment, a method of monitoring communications onboard an aircraft is provided. The method involves a processing system onboard the aircraft identifying a functional change to an onboard avionics system, identifying a designation associated with a pilot responsible for the functional change, determining an expected callout pertaining to the functional change based at least in part on the functional change, the designation associated with the pilot, and one or more callout rules associated with the onboard avionics system, monitoring an audio input device for the expected callout, and generating a user notification in response to an absence of the expected callout.

In another embodiment, an aircraft system is provided. The aircraft system includes an avionics system, a data storage element maintaining one or more callout rules, an audio input device, an output device, and a processing system coupled to the data storage element, the avionics system, the audio input device, and the output device. The processing system is configurable to identify a source of a change to a functionality of the avionics system, determine an expected response to the change by a pilot based at least in part on the change, the source, and the one or more callout rules, monitor the audio input device for the expected response by the pilot, and generate a user notification via the output device in response to an absence of the expected response.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
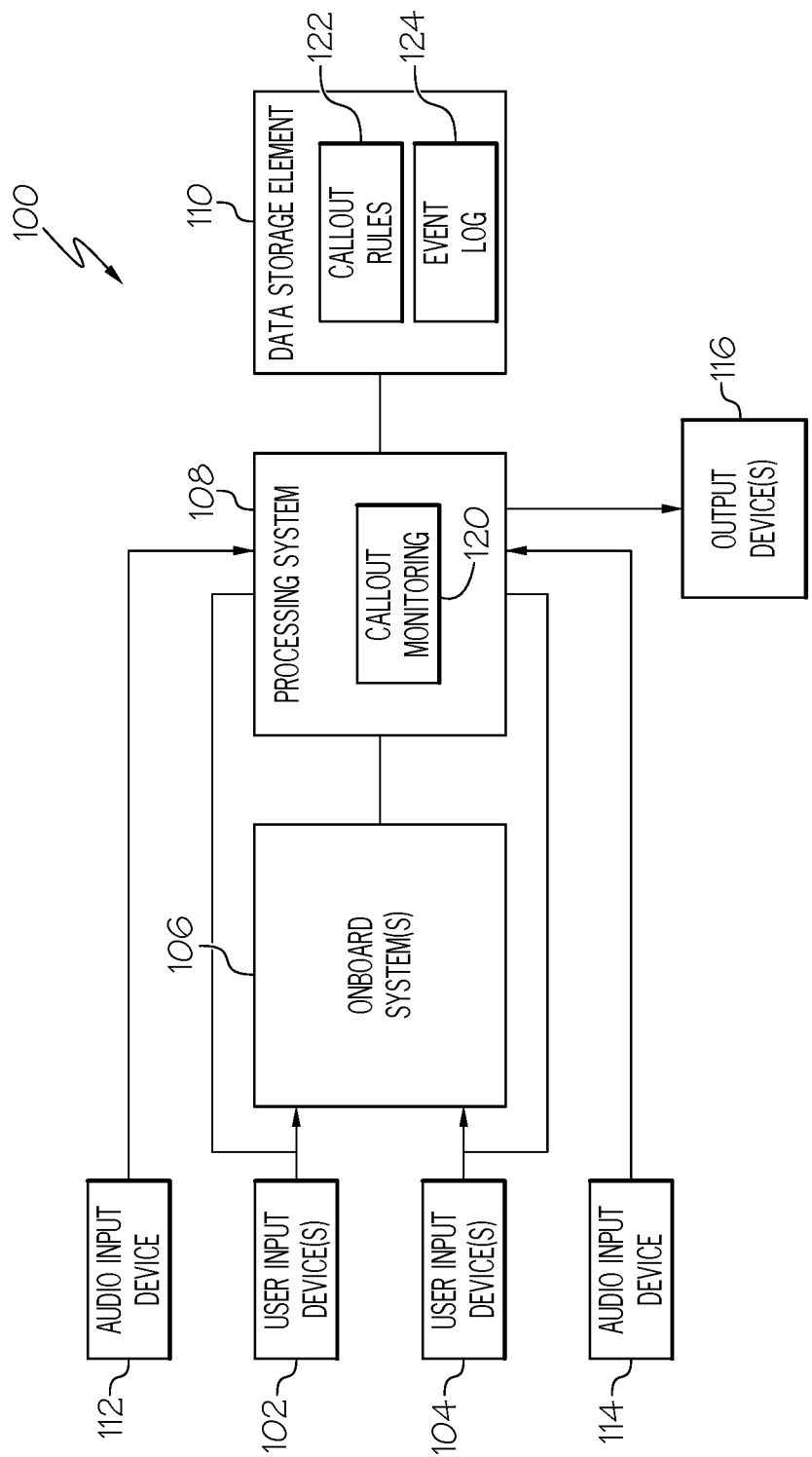
FIG. 1 is a block diagram illustrating a vehicle system in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to systems and methods for monitoring communications associated with vehicle operations for adherence to or compliance with one or more regulations or requirements (e.g., governmental regulations, safety regulations, standard operating procedures, and/or the like). For purposes of explanation, the subject matter is primarily described herein in the context of monitoring communications among or between pilots during operation of an aircraft; however, the subject matter described herein is not necessarily limited to aircraft or avionic environments or for communications between operators within the cockpit, and in alternative embodiments, may be implemented in an equivalent manner for monitoring communications associated with operators of other types of vehicles (e.g., automobiles or other ground-based vehicles, vessels or marine-based vehicles, etc.) or communications between a pilot and another individual outside the cockpit (e.g., an air traffic controller, a cabin crew member, or the like).

As described in greater detail below, in exemplary embodiments, onboard systems are monitored for any changes to their respective functionality, such as, for example, a change in operating mode or operating status, a change to the value of an operational parameter that dictates operation of the system, and/or the like. For example, in the context of an aircraft, onboard systems are monitored for aircraft system changes (e.g., flap settings, speed brake settings, landing gear settings, light settings, tuned radio frequency, selected navigation source, etc.) or aircraft state changes (e.g., based on flight phase, altitude levels, airspeeds, sensed position, etc.). In response to identifying a change to the functionality of an onboard system, an expected communication by a vehicle operator in response to the change is determined based on the rules, regulations, or other procedures prescribing onboard communications among aircraft operators. In this regard, the rules may require a particular callout or acknowledgment by a pilot based on one or more of the onboard system where the change occurred, the nature of the change to the functionality of that onboard system, and the source of that change (e.g., the designation of the pilot who initiated the change, the identification of an onboard system that initiated an automated change, and/or the like). After the expected response communication is determined, audio input devices onboard the aircraft are monitored for the required response communication by the prescribed pilot. In the absence of the expected communication by the prescribed pilot within a threshold period of time after the change to the onboard system functionality occurred (e.g., when the prescribed pilot either fails to respond or responds with an incorrect or inadequate callout), a user notification is automatically generated to notify the appropriate pilot of the functional change, thereby helping to ensure the pilot is aware of the current functionality and status of the onboard system that was changed. In this regard, the user notification may include information or operational parameters that quantify, characterize, or otherwise pertain to the functional change, with that information or operational parameters being prescribed by the applicable rules, regulations, or procedures.

For example, in one or more embodiments, an audio input device associated with the captain or pilot in command may be monitored to ensure the pilot makes the appropriate callout after initiating a change to the functionality of an onboard system. In this regard, based on the pilot's designation or role, the onboard system being changed, and the quantity or nature of the change to the functionality, the content of an expected callout by the pilot flying the aircraft may be determined based on applicable communications rules (or callout rules), which may be prescribed by a governmental or regulatory body associated with the current airspace or location the aircraft is operating in, an aircraft manufacturer associated with the aircraft, an airline associated with the aircraft, and/or the like. Thereafter, the audio input device associated with the pilot that initiated the change may be monitored for a responsive communication that includes the content of the expected callout. In the absence of the expected callout within a threshold period of time after the functional change was initiated, an automated callout including the content of the expected callout may be automatically generated via an audio output device in the cockpit and/or automatically displayed on a display device in the cockpit to apprise a co-pilot, first officer, or other pilot monitoring the aircraft of the functional change initiated by the pilot in command. Thus, the first officer or another pilot may be apprised of a functional change initiated by the captain or pilot in command in accordance with the applicable callout rules in the event of a failure by the captain or pilot in command to annunciate the required callout.

In a similar manner, in some embodiments, an audio input device associated with co-pilot, first officer, or other pilot monitoring the aircraft may be monitored to ensure the pilot makes the appropriate acknowledgment of a change to the functionality of an onboard system initiated by the captain or pilot in command. For example, the content of an expected acknowledgment by the pilot monitoring the aircraft may be determined according to the applicable callout rules based on the combination of one or more of the onboard system that was changed, the quantity or nature of the functional change, the captain or pilot in command being the source of the change, and/or the role or designation of the pilot being monitored for the acknowledgment. Thereafter, the audio input device associated with the pilot monitoring the aircraft may be monitored for a responsive communication that includes the content of the expected acknowledgment. In some embodiments, in the absence of the expected acknowledgment within a threshold period of time after the functional change was initiated, a notification may be automatically generated via an audio output device in the cockpit and/or automatically displayed on a display device in the cockpit to ensure the co-pilot, first officer, or other pilot monitoring the aircraft is aware of the functional change initiated by the pilot in command. In other embodiments, a notification may be automatically generated that is intended to notify the captain or pilot in command that the other pilot is unaware of the functional change, thereby allowing the captain or pilot in command to repeat a callout or take other remedial actions to ensure the co-pilot, first officer, or other pilot monitoring is appropriately aware of the functional change to the onboard system.

In a similar manner, in response to functional changes initiated by a co-pilot, first officer, or other pilot monitoring the aircraft, an audio input device associated with the pilot monitoring the aircraft may be monitored for an expected callout and/or an audio input device associated with the captain or pilot in command may be monitored for an expected acknowledgment. Additionally, in exemplary embodiments, the audio input device(s) in the cockpit are also monitored for expected responses to functional changes that were automatically initiated by onboard systems. For example, a flight management system (FMS) or other onboard system may automatically initiate a change to its own functionality or the functionality of another system onboard the aircraft. A pilot monitoring the aircraft may be expected to notice the automated functional change and annunciate a callout according to the applicable callout rules. In the absence of the expected acknowledgment of an automated functional change within a threshold period of time, an automated response or notification may be generated to help ensure one or more of the pilots are aware of the functional change that occurred automatically.

It should be appreciated that subject matter described herein increases the likelihood of pilots being aware of functional changes to onboard systems even in the event of a manual failure or lapse in communications by one of the pilots (e.g., due to workload, stress, incapacity, etc.). Accordingly, safer and more predictable aircraft operations may be achieved by improving adherence to or compliance with applicable rules, regulations, procedures, and/or the like.

FIG. 1 depicts an exemplary embodiment of a system 100 suitable for use with a vehicle, such as an aircraft. The illustrated vehicle system 100 includes, without limitation, one or more user input devices 102, 104, one or more vehicle systems 106, a processing system 108, a data storage element 110, one or more audio input devices 112, 114, and one or more output device(s) 116. It should be appreciated that FIG. 1 depicts a simplified representation of a vehicle system 100 for purposes of explanation and is not intended to limit the subject matter in any way. In this regard, it should be noted that the illustrated embodiment depicts a dual operator or dual pilot configuration of the system 100, where one set of input devices 102, 112 are associated with a captain or pilot in command and another set of input devices 104, 114 are associated with a first officer, co-pilot, or other pilot monitoring operation of the vehicle. However, other embodiments of the vehicle system 100 could include additional sets of input devices for supporting additional crew members, while in yet other embodiments, one or more input devices may be shared or utilized by more than vehicle operator. That said, the subject matter may be described herein primarily in the context of an aircraft system arranged in a dual pilot configuration, where one set of input devices 102, 112 are associated with the pilot seated in the left seat position in the cockpit (e.g., the captain) and the other set of input devices 104, 114 are associated with the pilot seated in the right seat position in the cockpit (e.g., the first officer).

The user input devices 102, 104 generally represent the various devices coupled to the onboard systems 106 that allow the vehicle operators to interface or otherwise interact with the onboard systems 106, such as, for example, one or more buttons, keypads, touchpads, keyboards, mice, touch panels (or touchscreens), joysticks, knobs, line select keys or any other suitable devices adapted to receive input from a user. The audio input devices 112, 114 generally represent one or more headsets, microphones, audio transducers, audio sensors, or other device that allows for audio input to be received or otherwise provided to the system 100. In this regard, in some embodiments, the audio input devices 112, 114 may be configured to allow a vehicle operator to command, control, or otherwise interact with an onboard system 106 in a "hands free" manner without requiring the user to move his or her hands, eyes and/or head to interact with the system 106. In exemplary embodiments, the output device 116 includes or is realized as a speaker or other audio output device, which, in some embodiments could be integrated with an audio input device 112, 114 as part of a headset. Additionally or alternatively, the output devices 116 may also include or be realized as one or more electronic display devices onboard the vehicle (e.g., a cockpit or dashboard display).

The onboard vehicle systems 106 generally represent any sort of electrical, mechanical, hydraulic, pneumatic, environmental, or propulsion systems configured to facilitate or otherwise support one or more aspects of operation of a vehicle. For example, in the case of an aircraft, the onboard vehicle systems 106 could include or otherwise be realized as any one or more of the following: a flight management system (FMS), a communications system, a navigational system, a weather system, an air traffic management system, a radar system, a traffic avoidance system, an autopilot system, an autothrust system, a landing gear system, a flight control system, hydraulics systems, pneumatics systems, environmental systems, electrical systems, engine systems, trim systems, lighting systems, crew alerting systems, electronic checklist systems, a heads-up display (HUD) or other display system(s), a ground proximity warning system, a yoke stick control system, an electronic flight bag and/or any other avionics system. A given onboard vehicle system 106 may support any number of different operating modes or control functions, and/or may operate in accordance with any number of parameters or settings that may be adjusted or configured to influence the operation or functionality of the respective system 106.

The processing system 108 generally represents the hardware, software, and/or firmware components (or a combination thereof), which is communicatively coupled to the various elements of the vehicle system 100 and configured to perform additional tasks and/or functions to support the communications monitoring process 200 of FIG. 2, as described in greater detail below. Depending on the embodiment, the processing system 108 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 may include processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. For example, in the illustrated embodiment, the processing system 108 includes or otherwise accesses a data storage element (e.g., data storage element 110) storing code or other computer-executable programming instructions that, when read and executed by the processing system 108, cause the processing system 108 to generate, implement, or otherwise execute a callout monitoring application 120 that supports or otherwise performs certain tasks, operations, functions, and/or processes described herein.

The data storage element 110 (or memory) generally represents any sort of non-transitory short or long term storage media. Depending on the embodiment, the data storage element 110 may include or otherwise be physically realized using random access memory (RAM), read only memory (ROM), flash memory, registers, a hard disk, or another suitable data storage medium known in the art or any suitable combination thereof. Moreover, in some embodiments, the data storage element 110 may be realized as a database or some other remote data storage or device that is communicatively coupled to the processing system 108 via a communications network. In exemplary embodiments, the data storage element 110 stores or otherwise maintains a set of rules or requirements for communications among operators of the vehicle, alternatively referred to herein as callout rules 122. Depending on the embodiment, the callout rules 122 may be prescribed by a governmental or regulatory body associated with an operating region for the vehicle, a manufacturer of the vehicle, and/or the like. For example, in an aviation context, some callout rules 122 may be required by the Federal Aviation Administration (FAA), International Civil Aviation Organization (ICAO), and/or the like, while other callout rules may be required by the aircraft manufacturer or by standard operating procedures for the airline or owner of the aircraft.

For a given onboard system 106, the callout rules 122 may prescribe different communications by different vehicle operators responsive to different changes to the functionality of the respective onboard system 106. For example, the callout rules 122 may dictate what content a vehicle operator should annunciate upon initiating a change to the functionality of an onboard system 106, what content another vehicle operator should acknowledge responsive to the vehicle operator annunciating a change, what content a vehicle operator should acknowledge in response to an automated change to the functionality of an onboard system 106, and/or the like. As described below, the callout monitoring application 120 at the processing system 108 utilizes the callout rules 122 to monitor audio input devices 112, 114 onboard the vehicle to ensure communications amongst or by vehicle operators are in compliance with the applicable callout rules 122 in response to functional changes at the onboard system(s) 106. In the illustrated embodiment, the data storage element 110 is also utilized to maintain an event log 124 for tracking the sequence of communications received from vehicle operators and/or the functional changes to onboard systems 106. In this regard, the event log 124 may be utilized to identify the applicable callout rules 122 for a current functional change based on the current context or status of the onboard systems 106, for example, based on one or more preceding functional changes, one or more preceding communications, and/or a sequence thereof. Additionally or alternatively, other onboard recording devices or systems may be utilized to track preceding communications, operational states or configurations, and/or the like, such as, for example, a cockpit voice recorder, a flight deck data recorder, an aircraft condition monitoring system, and/or the like. Accordingly, in some embodiments, the event log 124 may be implemented or realized by another onboard system 106 that monitors one or more aspects of the aircraft.

Figure 2:
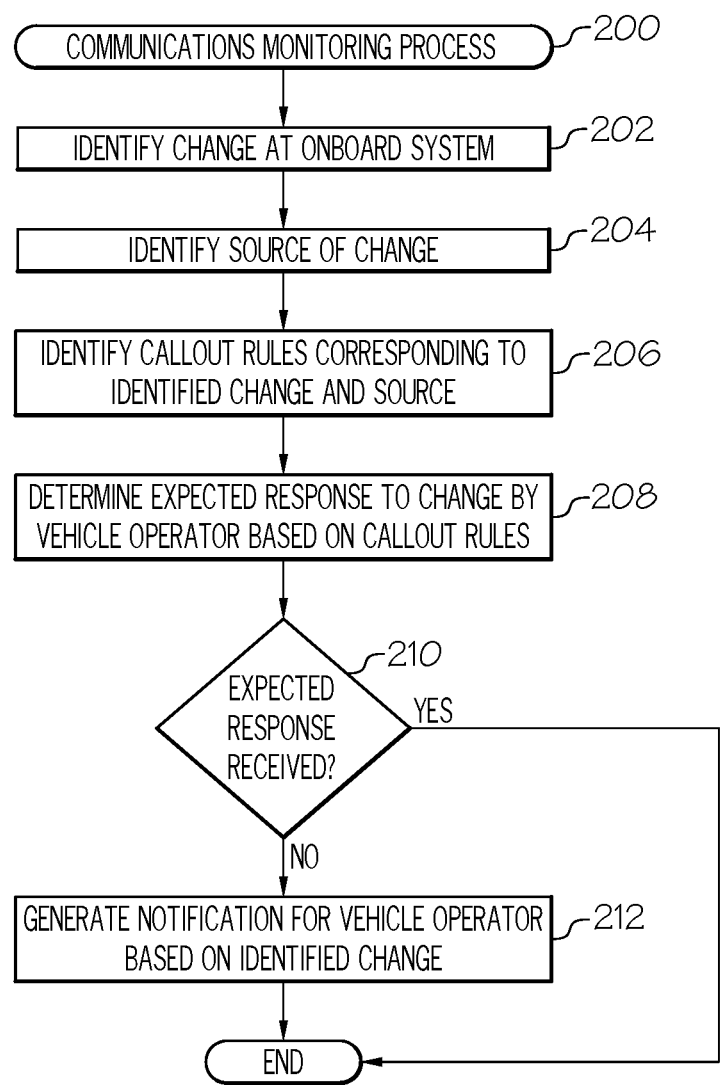
FIG. 2 is a flow diagram illustrating a communications monitoring process suitable for implementation in the vehicle system of FIG. 1 in accordance with one or more exemplary embodiments.

Referring now to FIG. 2, in an exemplary embodiment, the aircraft system 100 is configured to support a communications monitoring process 200 and perform additional tasks, functions, and operations described below to facilitate adherence to or compliance with applicable callout requirements or regulations. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the communications monitoring process 200 may be performed by different elements of the aircraft system 100. That said, exemplary embodiments are described herein in the context of the communications monitoring process 200 being primarily performed by the processing system 108 and/or the callout monitoring application 120. It should be appreciated that the communications monitoring process 200 may include any number of additional or alternative tasks, the tasks need not be performed in the illustrated order and/or the tasks may be performed concurrently, and/or the communications monitoring process 200 may be incorporated into a more comprehensive procedure or process having additional functionality not described in detail herein. Moreover, one or more of the tasks shown and described in the context of FIG. 2 could be omitted from a practical embodiment of the communications monitoring process 200 as long as the intended overall functionality remains intact.

The illustrated communications monitoring process 200 initializes or otherwise begins in response to detecting or otherwise identifying a change to a functionality at an onboard system (task 202). In this regard, in some embodiments, the processing system 108 may monitor an output of an onboard system 106 and detect or otherwise identify a change at the output of the onboard system 106. For example, an onboard system 106 may output a flag or other indicator that identifies the current operating mode or functional state of the onboard system 106 or a component thereof. In other embodiments, the processing system 108 may monitor the output or state of a user input 102, 104 associated with an onboard system 106 to identify a functional change in response to a change at the user input device 102, 104. For example, the processing system 108 may monitor the position or state of a lever, knob, or other control interface and detect a functional change in response to manipulation of the user input device 102, 104 associated with a particular onboard system 106.

The communications monitoring process 200 continues by identifying or otherwise determining a source of the functional change, that is, the entity or actor responsible for initiating or requesting the change to the functionality of the onboard system (task 204). In some embodiments, the source of the change is identified based on the particular user input device 102, 104, 112, 114 utilized to initiate the change. For example, input devices 102, 112 arranged or provided on the left side of the cockpit may be associated with a captain or pilot of an aircraft, with input devices 104, 114 arranged or provided on the right side of the cockpit being associated with a first officer or co-pilot. Thus, if the input initiating the change is received from one of the captain's input devices 102, 112, the callout monitoring application 120 may identify the captain as the source of the change. Conversely, if the input initiating the change is received from one of the first officer's input devices 104, 114, the callout monitoring application 120 may identify the first officer as the source of the change. In some embodiments that support voice commands for operating an onboard system 106, the callout monitoring application 120 may perform voice or speaker recognition to identify the individual speaker who is the source of the command to change the functionality (e.g., by matching pitch, speaking style, or other biometric characteristics of the received input to one of the operators). Additionally, in some embodiments, when an automated change occurs to the functionality of the onboard system 106, the callout monitoring application 120 may identify the source as the particular onboard system 106 that initiated the change (e.g., based on analyzing the input and output parameters of the onboard systems 106).

In one or more exemplary embodiments, after identifying a functional change to an onboard system 106 and the source thereof, the callout monitoring application 120 updates the event log 124 with an entry that maintains an association between the functional change and the source of the change. For example, the entry may associate one or more of: an identifier for the onboard system 106 where the change occurred, an identifier associated with the vehicle operator or the particular input device 102, 104, 112, 114 or system 106 that initiated the change, the current state, mode or functionality provided by the onboard system 106 after the change or some other indicia of the nature of the change (i.e., the destination state of the onboard system 106 after the change), and/or the preceding state, mode or functionality provided by the onboard system 106 (i.e., the initial state of the onboard system 106 prior to the change).

In response to a change in the functionality of an onboard system, the communications monitoring process 200 continues by identifying or otherwise determining the applicable callout rules applicable to the change and determines an expected response to the change based on the callout rules (tasks 206, 208). In this regard, based at least in part on the identification of the source of the change (e.g., the designation of the pilot responsible for initiating the change), the identification of the onboard system 106 where the change occurred, and the identification or nature of the functional change that occurred, the callout monitoring application 120 obtains the applicable callout rules for the current situation, for example, by querying for a callout rule 122 associated with the identified combination of the source identifier (e.g., the initiating pilot's designation), the onboard system identifier, and the current functional change. Furthermore, in various embodiments, the callout rules 122 may also be associated with the current operating context (e.g., the current phase of flight, the current state of one or more other onboard systems 106, the current geographic location of the aircraft, the current airspace, or some other status information associated with the aircraft) and/or the preceding operating context (e.g., the initial or preceding state of the onboard system 106 being changed). In such embodiments, the callout monitoring application 120 may identify the current operational context using on one or more onboard systems 106, and then identify the callout rule associated with the combination of the current operational context, the source of the current change, the system 106 being changed, and/or the identification of the functional change. In various embodiments, one or more preceding functional changes or callouts may be identified (e.g., using the event log 124) and utilized to further define the current operational context. In exemplary embodiments, the applicable callout rule identified by the callout monitoring application 120 indicates a particular vehicle operator that is expected to annunciate a response to the change and the anticipated or required content for such a response, and may thereby be utilized by the callout monitoring application 120 to determine the expected respondent and the expected response to the functional change. For example, based on the pilot flying the aircraft annunciating "gear down" and the landing gear state being changed by another pilot not flying, the callout monitoring application 120 may determine the pilot not flying is expected to respond to the change to the landing gear system with a response that confirms or otherwise identifies that the landing gear is down.

After a change to the functionality of an onboard system, the communications monitoring process 200 monitors the onboard audio input device(s) to verify or otherwise confirm whether the expected response to the functional change occurs (task 210). In this regard, the callout monitoring application 120 monitors one or more of the audio input devices 112, 114 for an audio input from the operator prescribed by the applicable callout rules that includes the content required by the callout rule. The callout monitoring application 120 may identify the operator associated with the audio input based on the respective audio input device 112, 114 the audio input is received from and/or by performing voice or speaker recognition on the received audio input. In exemplary embodiments, the audio input is converted to a corresponding textual representation (e.g., by performing speech recognition or other speech-to-text conversion techniques), and the callout monitoring application 120 then parses or otherwise analyzes the textual representation of the received audio input to identify the required content or acknowledgment of the functional change within the received audio input. In response to receiving the expected response to the functional change, the communications monitoring process 200 verifies or otherwise confirms adherence to the callout rules 122 and may terminate or exit until a subsequent functional change is initiated.

In exemplary embodiments, the communications monitoring process 200 monitors the onboard audio input device(s) for a threshold period of time before generating a user notification in the absence of the expected response within the threshold period of time (task 212). In some embodiments, the callout monitoring application 120 may monitor the audio input device(s) 112, 114 for a fixed default period of time after initiation of any functional change (e.g., 30 seconds). That said, in other embodiments, the callout rules 122 may prescribe different periods of time during which the expected response must occur. For example, some functional changes pertaining to more critical operations or systems may require a quicker response, while other less significant changes may allow a longer period for response. Accordingly, the threshold period of time may vary depending on the particular functional change, the particular system 106 being changed, the source of the change, and/or the like. In some embodiments, the communications monitoring process 200 may also identify the absence of the expected response in response to identifying a response that does not match or otherwise correspond to the functional change. For example, the callout monitoring application 120 may generate a user notification in response to a response that identifies a different onboard system 106 than the one where the functional change occurred and/or a response that identifies values, parameters, or other characteristics that deviate from those associated with the functional change.

In some embodiments, the callout monitoring application 120 generates a user notification that emulates or effectuates the expected response, for example, by automatically generating an audio output via an audio output device 116 that includes the prescribed content for the expected response. Additionally or alternatively, the callout monitoring application 120 may automatically generate a graphical representation of the prescribed content for the expected response on one or more onboard display devices 116, to thereby provide the expected response visually. In other embodiments, the callout monitoring application 120 generates a user notification that indicates or otherwise reminds a vehicle operator to perform the expected response. For example, the callout monitoring application 120 may graphically display a reminder to a vehicle operator to annunciate the expected response on a display device 116 associated with that vehicle operator (e.g., on a cockpit display located the right side of the cockpit for the first officer, etc.).

Referring to FIGS. 1-2, as one example, a captain of an aircraft may manipulate an assigned or associated user input device 102 to initiate a functional change at an onboard avionics system 106. Based on the identification of the captain as the source of the change, the destination avionics system 106 where the functional change occurs, and the nature of the functional change, the callout monitoring application 120 identifies the appropriate callout rule 122 that applies to the current operational context. If the callout rule requires the captain annunciate a response pertaining to the functional change he or she has initiated, the callout monitoring application 120 monitors the captain's associated audio input device 112 (e.g., the microphone of the captain's headset) for the expected callout of the functional change. In the absence of the expected callout by the captain, the callout monitoring application 120 may generate or otherwise provide a reminder to the captain to make the required callout, or alternatively, the callout monitoring application 120 may automatically generate or otherwise provide the required callout via an onboard output device 116. For example, the callout monitoring application 120 may automatically provide the required callout response to the functional change at an output device 116 that is accessible or viewable to the first officer to apprise the first officer of the functional change initiated by the captain. Thus, the communications monitoring process 200 attempts to ensure that the captain maintains compliance with the callout rules or otherwise attempts to ensure the objective of the callout rules is achieved by notifying the first officer of the functional change.

Similarly, if the callout rule requires the first officer annunciate an acknowledgment pertaining to the functional change initiated by the captain, the callout monitoring application 120 monitors the first officer's associated audio input device 114 for the expected acknowledgment of the functional change. In the absence of the expected acknowledgment by the first officer, the callout monitoring application 120 may generate or otherwise provide the expected acknowledgment or other indication of the functional change to the first officer (e.g., at an output device 116 that is accessible or viewable to the first officer). Thus, the communications monitoring process 200 attempts to ensure the first officer is aware of the functional change initiated by the captain in the absence of an explicit acknowledgment. Likewise, if the functional change was automatically initiated by an onboard avionics system 106, such as the FMS, the communications monitoring process 200 attempts to ensure the captain and/or first officer is aware of the functional change that was initiated by the FMS, for example, by generating a user notification that identifies the avionics system 106 that was changed and the manner in which it was changed in the absence of the captain and/or first officer explicitly acknowledging the functional change.

Figure 3:
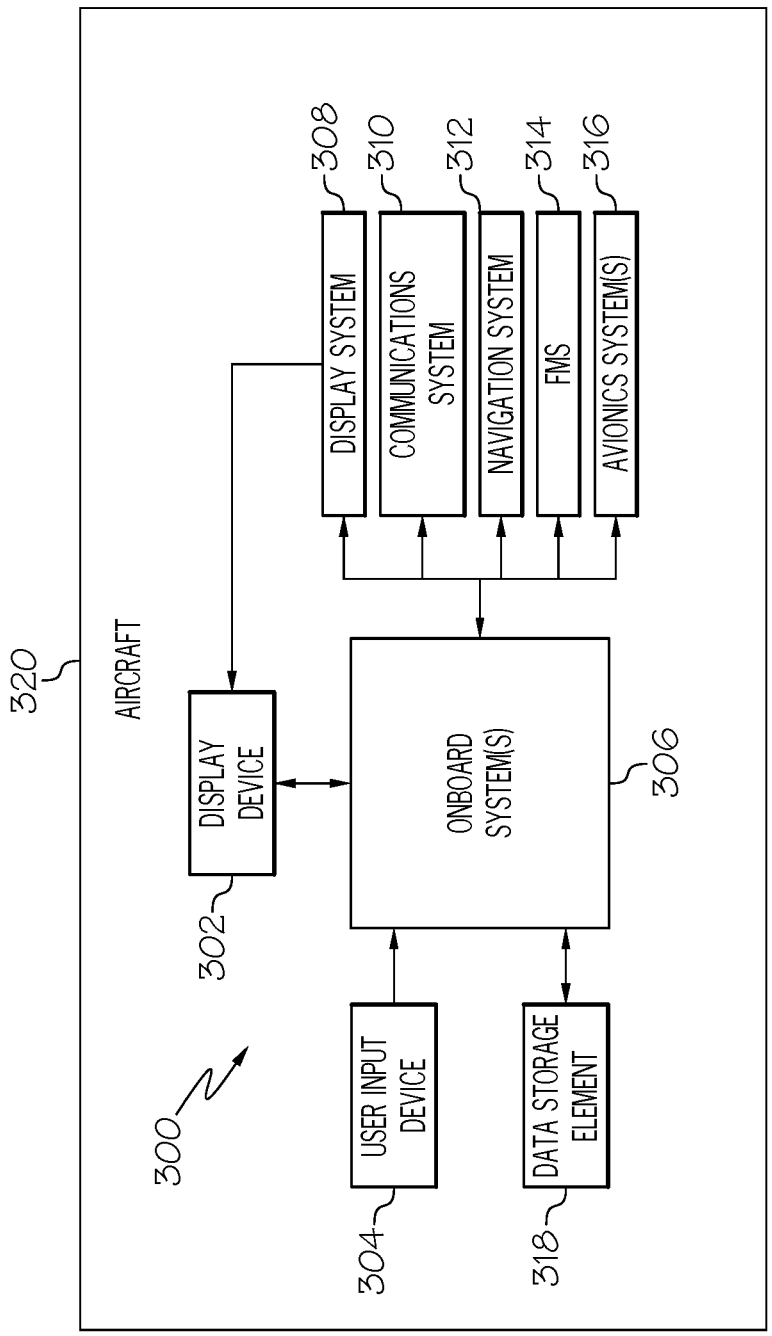
FIG. 3 is a block diagram illustrating an aircraft system in accordance with one or more exemplary embodiments.

FIG. 3 depicts an exemplary embodiment of an aircraft system 300 suitable for implementing the communications monitoring process 200 with respect to a functional change initiated at a system 308, 310, 312, 314, 316 onboard an aircraft 320. The illustrated aircraft system 300 includes, without limitation, a display device 302, one or more user input devices 304, a processing system 306, a display system 308, a communications system 310, a navigation system 312, a flight management system (FMS) 314, one or more avionics systems 316, and a data storage element 318 suitably configured to support operation of the system 300.

In exemplary embodiments, the display device 302 is realized as an electronic display capable of graphically displaying flight information or other data associated with operation of the aircraft 320 under control of the display system 308 and/or processing system 306. In this regard, the display device 302 is coupled to the display system 308 and the processing system 306, wherein the processing system 306 and the display system 308 are cooperatively configured to display, render, or otherwise convey one or more graphical representations or images associated with operation of the aircraft 320 on the display device 302. The user input device 304 is coupled to the processing system 306, and the user input device 304 and the processing system 306 are cooperatively configured to allow a user (e.g., a pilot, co-pilot, or crew member) to interact with the display device 302 and/or other elements of the system 300, as described herein. Depending on the embodiment, the user input device(s) 304 may be realized as a keypad, touchpad, keyboard, mouse, touch panel (or touchscreen), joystick, knob, line select key or another suitable device adapted to receive input from a user. In some embodiments, the user input device 304 includes or is realized as an audio input device, such as a microphone, audio transducer, audio sensor, or the like, that is adapted to allow a user to provide audio input to the system 300 in a "hands free" manner without requiring the user to move his or her hands, eyes and/or head to interact with the system 300.

The processing system 306 generally represents the hardware, software, and/or firmware components configured to facilitate communications and/or interaction between the elements of the aircraft system 300 and perform additional tasks and/or functions to support the communications monitoring process 200 of FIG. 2 during operation of the aircraft system 300, as described herein. Depending on the embodiment, the processing system 306 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 306 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 306 includes processing logic that may be configured to carry out the functions, techniques, and processing tasks associated with the operation of the aircraft system 300, as described herein. Furthermore, the steps of a method or algorithm described in connection with the embodiments disclosed herein may be embodied directly in hardware, in firmware, in a software module executed by the processing system 306, or in any practical combination thereof. For example, in one or more embodiments, the processing system 306 includes or otherwise accesses a data storage element (or memory), which may be realized as any sort of non-transitory short or long term storage media capable of storing programming instructions for execution by the processing system 306. The code or other computer-executable programming instructions, when read and executed by the processing system 306, cause the processing system 306 to support or otherwise perform certain tasks, operations, functions, and/or processes described herein.

The display system 308 generally represents the hardware, software, and/or firmware components configured to control the display and/or rendering of one or more navigational maps and/or other displays pertaining to operation of the aircraft 320 and/or onboard systems 310, 312, 314, 316 on the display device 302. In this regard, the display system 308 may access or include one or more databases suitably configured to support operations of the display system 308, such as, for example, a terrain database, an obstacle database, a navigational database, a geopolitical database, a terminal airspace database, a special use airspace database, or other information for rendering and/or displaying navigational maps and/or other content on the display device 302.

In exemplary embodiments, the aircraft system 300 includes a data storage element 318, which contains aircraft procedure information (or instrument procedure information) for a plurality of airports and maintains association between the aircraft procedure information and the corresponding airports. Depending on the embodiment, the data storage element 318 may be physically realized using RAM memory, ROM memory, flash memory, registers, a hard disk, or another suitable data storage medium known in the art or any suitable combination thereof. The aircraft procedure information may be provided by or otherwise obtained from a governmental or regulatory organization, such as, for example, the Federal Aviation Administration in the United States. Similarly, in exemplary embodiments described herein, the data storage element 318 also maintains callout rules or procedures, which in some embodiments may be prescribed or provided by a governmental or regulatory organization.

Still referring to FIG. 3, in an exemplary embodiment, the processing system 306 is coupled to the navigation system 312, which is configured to provide real-time navigational data and/or information regarding operation of the aircraft 320. The navigation system 312 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 312, as will be appreciated in the art. The navigation system 312 is capable of obtaining and/or determining the instantaneous position of the aircraft 320, that is, the current (or instantaneous) location of the aircraft 320 (e.g., the current latitude and longitude) and the current (or instantaneous) altitude or above ground level for the aircraft 320. The navigation system 312 is also capable of obtaining or otherwise determining the heading of the aircraft 320 (i.e., the direction the aircraft is traveling in relative to some reference). In the illustrated embodiment, the processing system 306 is also coupled to the communications system 310, which is configured to support communications to and/or from the aircraft 320. For example, the communications system 310 may support communications between the aircraft 320 and air traffic control or another suitable command center or ground location. In this regard, the communications system 310 may be realized using a radio communication system and/or another suitable data link system.

In an exemplary embodiment, the processing system 306 is also coupled to the FMS 314, which is coupled to the navigation system 312, the communications system 310, and one or more additional avionics systems 316 to support navigation, flight planning, and other aircraft control functions in a conventional manner, as well as to provide real-time data and/or information regarding the operational status of the aircraft 320 to the processing system 306. Although FIG. 3 depicts a single avionics system 316, in practice, the aircraft system 300 and/or aircraft 320 will likely include numerous avionics systems for obtaining and/or providing real-time flight-related information that may be displayed on the display device 302 or otherwise provided to a user (e.g., a pilot, a co-pilot, or crew member). For example, practical embodiments of the aircraft system 300 and/or aircraft 320 will likely include one or more of the following avionics systems suitably configured to support operation of the aircraft 320: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. As described above, in various embodiments, the processing system 306 may obtain information pertaining to the current location and/or altitude of the aircraft 320 and/or other operational information characterizing or otherwise describing the current operational context or status of the aircraft 320 from one or more of the onboard systems 308, 310, 312, 314, 316, and the current operational context may be utilized by the processing system 306 to identify the appropriate callout rule(s) applicable to the current operational context (e.g., the current airspace or geographic location, the current flight phase, and/or the like).

It should be understood that FIG. 3 is a simplified representation of the aircraft system 300 for purposes of explanation and ease of description, and FIG. 3 is not intended to limit the application or scope of the subject matter described herein in any way. It should be appreciated that although FIG. 3 shows the various elements of the system 300 being located onboard the aircraft 320 (e.g., in the cockpit), in practice, one or more of the elements of the system 300 may be located outside the aircraft 320 (e.g., on the ground as part of an air traffic control center or another command center) and communicatively coupled to the remaining elements of the aircraft system 300 (e.g., via a data link and/or communications system 310). For example, in some embodiments, the data storage element 318 may be located outside the aircraft 320 and communicatively coupled to the processing system 306 via a data link and/or communications system 310. Furthermore, practical embodiments of the aircraft system 300 and/or aircraft 320 will include numerous other devices and components for providing additional functions and features, as will be appreciated in the art. In this regard, it will be appreciated that although FIG. 3 shows a single display device 302, in practice, additional display devices may be present onboard the aircraft 320. Additionally, it should be noted that in other embodiments, features and/or functionality of processing system 306 described herein can be implemented by or otherwise integrated with the features and/or functionality provided by the FMS 314. In other words, some embodiments may integrate the processing system 306 with the FMS 314. In yet other embodiments, various aspects of the subject matter described herein may be implemented by or at an electronic flight bag (EFB) or similar electronic device that is communicatively coupled to the processing system 306 and/or the FMS 314.

For the sake of brevity, conventional techniques related to speech recognition, aviation communications, aviation terminology, flight management, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of monitoring operation of an aircraft, the method comprising:
   monitoring, by a processing system onboard the aircraft, an onboard avionics system to detect a change to a functionality of the onboard avionics system from an initial state to a destination state of the onboard avionics system; and
   in response to detecting the change to the functionality of the onboard avionics system from the initial state to the destination state:
      identifying, by the processing system, a first aircraft operator as a source initiating the change to the functionality of the onboard avionics system;
      identifying, by the processing system, a current flight phase of the aircraft;
      determining, by the processing system, first required content for an expected callout by the first aircraft operator to the change to the functionality of the onboard avionics system based at least in part on the change from the initial state to the destination state, a designation or role associated with the first aircraft operator initiating the change, and one or more callout rules associated with the current phase of flight and the onboard avionics system, wherein the required content for the expected callout is prescribed by the one or more callout rules for the combination of the change to the functionality and the source of the change;
   monitoring, by the processing system, an audio input device coupled to the processing system for the expected callout from the first aircraft operator;
   verifying content of at least some of an audio input received via the audio input device matches the required content for the expected callout within a threshold period of time after the functional change associated with the destination state, wherein the threshold period varies based on a significance of the functional change, the onboard avionics system being changed, and the source of the functional change;
   generating, by the processing system at an output device coupled to the processing system, a user notification including the first required content in response to an absence of the expected callout from the first aircraft operator when the content of at least some of the audio input fails to match the required content for the expected callout within the threshold period of time after the functional change;
   determining, by the processing system, second required content for an expected acknowledgement by a second aircraft operator to the change to the functionality of the onboard avionics system;
   monitoring, by the processing system, a second audio input device coupled to the processing system for the expected acknowledgement from the second aircraft operator; and
   generating, by the processing system, a second user notification including the second required content in response to an absence of the expected acknowledgement from the second aircraft operator.

2. The method of claim 1, the designation or role comprising a captain of the aircraft, wherein:
   determining the first required content for the expected callout comprises determining the first required content for an expected annunciation of the functional change by the captain; and
   monitoring the audio input device comprises monitoring the audio input device associated with the captain for the audio input corresponding to the expected annunciation.

3. The method of claim 2, further comprising:
   converting the audio input to a textual representation of the audio input; and
   verifying at least some of the textual representation matches the first required content of the expected annunciation.

4. The method of claim 1, the designation or role comprising a captain of the aircraft, wherein:
   determining the second required content comprises determining the second required content for the expected acknowledgment of the functional change by a first officer of the aircraft; and
   monitoring the second audio input device comprises monitoring the second audio input device associated with the first officer for a second audio input corresponding to the expected acknowledgment.

5. The method of claim 1, the designation or role comprising a first officer of the aircraft, wherein:

determining the first required content for the expected callout comprises determining the first required content for an expected annunciation of the functional change by the first officer; and monitoring the audio input device comprises monitoring a first audio input device associated with the first officer for the audio input corresponding to the expected annunciation.

6. The method of claim 5, wherein:

determining the second required content comprises determining the second required content for the expected acknowledgment of the functional change by a captain of the aircraft; and monitoring the second audio input device comprises monitoring the second audio input device associated with the captain for a second audio input corresponding to the expected acknowledgment.

7. The method of claim 1, wherein:

monitoring the onboard avionics system comprises monitoring an output of the onboard avionics system for a flag that indicates the change to the functionality of the onboard avionics system; and the onboard avionics system comprises one of a mechanical, hydraulic, pneumatic, environmental, or propulsion system.

8. The method of claim 1, wherein:

monitoring the onboard avionics system comprises monitoring a state of a user input device associated with the onboard avionics system to detect the change to the functionality of the onboard avionics system in response to a change at the user input device; and the onboard avionics system comprises one of a mechanical, hydraulic, pneumatic, environmental, or propulsion system.

9. The method of claim 1, wherein:

generating the user notification comprises generating an automated response comprising one or more operational parameters that characterize the functional change; and the one or more operational parameters are prescribed by the one or more callout rules.

10. The method of claim 1, wherein the one or more callout rules are prescribed by an aircraft manufacturer or an airline associated with the aircraft.

11. The method of claim 1, wherein the change comprises a change to one or more of a flap setting, a speed brake setting, a landing gear setting, a light setting and a selected navigation source.

12. The method of claim 1, wherein the onboard avionics system comprises a flight management system (FMS).

13. The method of claim 1, wherein identifying the first aircraft operator as the source comprises identifying the first aircraft operator as the source when a user input device utilized to initiate the change is associated with the first aircraft operator.

14. The method of claim 1, wherein monitoring the onboard avionics system to detect the change comprises monitoring an output of the onboard avionics system to detect the change from the initial state to the destination state at the output of the onboard avionics system.

15. The method of claim 1, wherein monitoring the onboard avionics system to detect the change comprises monitoring a state of a user input device associated with the onboard avionics system to detect the change from the initial state to the destination state at the user input device.

16. The method of claim 1, wherein monitoring the onboard avionics system to detect the change comprises monitoring a position or a state of a lever, knob, or other control interface associated with the onboard avionics system to detect the change from the initial state to the destination state.

17. The method of claim 1, wherein the one or more callout rules are associated with at least one of the destination state of the onboard avionics system and the initial state of the onboard avionics system.

18. A non-transitory computer-readable medium having executable instructions stored thereon that, when executed by a processing system, cause the processing system to:

monitor an onboard avionics system of an aircraft to detect a change to a functionality of the onboard avionics system from an initial state to a destination state; and in response to detecting the change to the functionality of the onboard avionics system from the initial stat to the destination state:

identify a first aircraft operator as a source of the change to the functionality of the avionics system;

identify a current flight phase of the aircraft;

determine first required content for an expected callout by the first aircraft operator to the change to the functionality of the onboard avionics system based at least in part on the change from the initial state to the destination state, a designation or role associated with the first aircraft operator initiating the change, and one or more callout rules associated with the current flight phase and the onboard avionics system, wherein the required content for the expected callout is prescribed by the one or more callout rules for the combination of the change to the functionality and the source of the change;

monitor the audio input device coupled to the processing system for the expected callout from the first aircraft operator;

verify content of at least some of an audio input received via the audio input device matches the required content for the expected callout within a threshold period of time after the functional change associated with the destination state, wherein the threshold period of time varies based on a significance of the change, the avionics system being changed, and the source of the functional change;

generate a user notification including the first required content in response to an absence of the expected callout from the first aircraft operator when the content of at least some of the audio input fails to match the required content for the expected callout within the threshold period of time after the change;

determine second required content for an expected acknowledgement by a second aircraft operator to the change to the functionality of the onboard avionics system;

monitor a second audio input device coupled to the processing system for the expected acknowledgement from the second aircraft operator; and generate a second user notification including the second required content in response to an absence of the expected acknowledgement from the second aircraft operator.

19. An aircraft system comprising:

an avionics system;

a data storage element maintaining one or more callout rules;

an audio input device;

an output device; and a processing system coupled to the data storage element, the avionics system, the audio input device, and the output device to:
monitor the avionics system to detect a change to a functionality of the avionics system from an initial state to a destination state;
identify a first aircraft operator as a source of the change to the functionality of the avionics system;
identify a current flight phase;
determine required content for an expected callout in response to the change by the first aircraft operator based at least in part on the change from the initial state to the destination state, the source, a designation or role associated with the first aircraft operator initiating the change, and the one or more callout rules associated with the current flight phase and the avionics system, wherein the required content for the expected callout is prescribed by the one or more callout rules for the combination of the change to the functionality and the source of the change;
monitor the audio input device for the expected callout by the first aircraft operator;
verify content of at least some of an audio input received via the audio input device matches the required content for the expected callout within a threshold period of time after the change associated with the destination state, wherein the threshold period of time varies based on a significance of the change, the avionics system being changed, and the source of the functional change;
generate a user notification including the required content for the expected callout via the output device in response to an absence of the expected callout from the first aircraft operator when the content of at least some of the audio input fails to match the required content for the expected callout within the threshold period of time after the change;
determine second required content for an expected acknowledgement by a second aircraft operator to the change to the functionality of the avionics system;
monitor the audio input device for the expected acknowledgement from the second aircraft operator; and
generate a second user notification including the second required content in response to an absence of the expected acknowledgement from the second aircraft operator.

20. The aircraft system of claim 19, wherein:
the data storage element maintains an event log for tracking a preceding sequence of one or more received communications and functional changes to the avionics system; and
the processing system identifies the one or more callout rules based on the preceding sequence.

* * * * *